United States Patent [19]
Jeong

[11] Patent Number: 6,108,978
[45] Date of Patent: Aug. 29, 2000

[54] DOOR GLASS RUN

[75] Inventor: Won Tae Jeong, Ulsan-si, Rep. of Korea

[73] Assignee: Hyundai Motor Company, Seoul, Rep. of Korea

[21] Appl. No.: 08/994,264

[22] Filed: Dec. 19, 1997

[30]    Foreign Application Priority Data

Dec. 21, 1996 [KR]  Rep. of Korea ...................... 96-69674

[51] Int. Cl.⁷ ....................................................... E06B 7/22
[52] U.S. Cl. ............................................. 49/440; 49/496.1
[58] Field of Search ............................... 49/475.1, 495.1, 49/498.1, 440, 496.1

[56]              References Cited

U.S. PATENT DOCUMENTS

| 3,448,550 | 6/1969 | Herr ........................................... 49/440 |
| 4,956,941 | 9/1990 | Vaughan .................................... 49/440 |
| 5,769,389 | 6/1998 | Jacobsen et al. ................... 251/129.06 |
| 5,804,276 | 9/1998 | Jacobs et al. ............................ 428/110 |
| 5,850,837 | 12/1998 | Shiroyama et al. .................... 128/892 |

FOREIGN PATENT DOCUMENTS

| 2697049 | 4/1994 | France . |
| 7-250421 | 9/1995 | Japan . |

*Primary Examiner*—Daniel P. Stodola
*Assistant Examiner*—Curtis A. Cohen
*Attorney, Agent, or Firm*—Christie, Parker & Hale, LLP

[57]              ABSTRACT

When shape-variable members are in an operating mode in which power is supplied to them, close-contact lips rotate in a counterclockwise direction, and an area of an opening widens. Accordingly, the close-contact lips do not contact the inner and outer surfaces of a door glass moving upwardly by the operation of a door glass switch. When the shape-variable members are in a non-operating mode in which the power supply to them is shut off, the close-contact lips rotate in a clockwise direction and closely contact the inner and outer surfaces of the door glass.

9 Claims, 4 Drawing Sheets

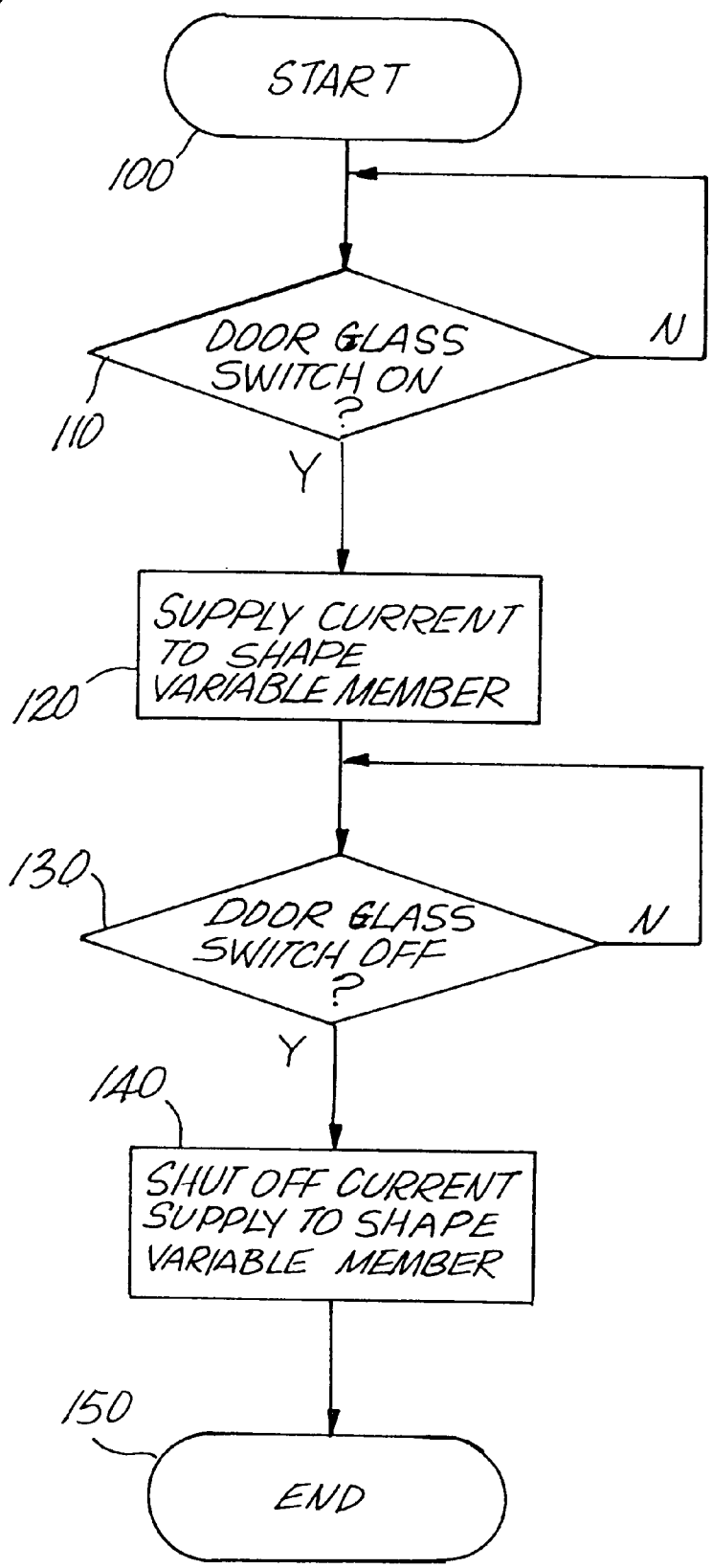

DOOR GLASS RUN

FIELD OF THE INVENTION

The present invention relates to a door glass run provided to a door of an automobile, and more particularly to a door glass run which effectively prevents noise and foreign materials such as dust, etc. from flowing into the cabin through a gap between the door glass and the door glass run thereby to provide a calm and comfortable on-board feeling and to increase its durability.

BACKGROUND OF THE INVENTION

Generally, a door glass run provided to a door of an automobile is used to shut off outside air so as to prevent noise, foreign material such as dust, etc. contained in the outside air from flowing into the automobile.

Referring to FIG. 1, there is shown a perspective view illustrating an automobile; and FIG. 2 is a cross-sectional view taken along the line II—II of FIG. 1, illustrating construction of a door glass run according to the related art. A door glass run 10 is maintained in a state to be fitted into a channel frame disposed between a door's outer panel and a door's inner panel to be securely fastened thereto, and is made from rubber to have a desired elasticity. The door glass run 10 includes a body 12, and the body 12 is formed with a closed space 14 and a door glass receiving space 16. An elastic lip portion 18 is arranged between the closed space 14 and the door glass receiving space 16. The elastic lip portion 18 is capable of being elastically deformed and functions as a partition wall which separates the closed space 14 and the door glass receiving space 16 from each other. The closed space 14 has a closed cross section. The door glass receiving space 16 is positioned adjacent to the closed space 14 and includes a portion which is opened to the outside. On edges of the body 12, which define the door glass receiving space 16, a first close-contact lip 20 and a second close-contact lip 22 are formed such that they are opposed to each other. An opening 24 is defined between the first close-contact lip 20 and the second close-contact lip 22. A door glass 26 can be received into the door glass receiving space 16 through the opening 24.

Referring now to FIG. 3, there is shown a cross-sectional view illustrating the door glass 26 and the door glass run 10 which are properly engaged with each other. When the door glass 26 is fully closed, the door glass 26 is inserted into the door glass receiving space 16 through the opening 24 while elastically deforming the first close-contact lip 20. By this, the first close-contact lip 20 is closely contacted to one surface of the door glass 26 while being rotated in a counterclockwise direction due to its elastic force. Then, an end surface of the door glass 26 which continuously moves upward in the door glass receiving space 16 elastically deforms the elastic lip portion 18. By this, the second close-contact lip 22 is closely contacted to the other surface of the door glass 26 while being rotated in a clockwise direction. Accordingly, by the fact that the elastic lip portion 18 is closely contacted to the end surface of the door glass 26 and the first and second close-contact lips 20 and 22 are closely contacted to inner and outer surfaces of the door glass 26, outside air is prevented from flowing into an automobile.

However, since the door glass run 10 of the related art, constructed as mentioned above, is made from rubber, the property of rubber is changed with the lapse of time and the door glass run 10 is hardened. By this, an original configuration of the door glass run 10 is changed irrespectively of whether the door glass run 10 is engaged with the door glass 26 or not. Therefore, as shown in FIG. 4, the door glass 26 is improperly engaged with the door glass run 10, and the first and second close-contact lips 20 and 22 of the door glass run 10 are squeezed by the door glass 26, and thereby the first and second close-contact lips 20 and 22 cannot be properly engaged with the inner and outer surfaces of the door glass 26. Accordingly, it is impossible to perfectly shut off the outside air whereby noise and foreign material such as dust, etc. can flow into the automobile through a gap between the close-contact lips 20 and 22 and the door glass 26 so as to deteriorate a comfortable feeling by occupants. The above-mentioned problems can be more serious when there is play in the door glass 26 due to its operation. Further, as the door glass run 10 is repeatedly squeezed by the door glass 26, durability of the door glass run 10 can be shortened.

SUMMARY OF THE INVENTION

Accordingly, the present invention has been made in an effort to solve the problems occurring in the related art, and an object of the present invention is to provide a door glass run and a method for driving the same which effectively prevents noise and foreign material such as dust, etc. from flowing into the cabin through a gap between the door glass and the door glass run thereby to provide a calm and comfortable on-board feeling and to increase its durability.

According to one aspect of the present invention, there is provided a door glass run for an automobile, comprising: a body having at least one close-contact lip; and at least one shape-variable member embedded into the body for causing the at least one close-contact lip to be rotated between a first position in which the at least one close-contact lip is not contacted to inner and/or outer surfaces of the door glass and a second position in which the at least one close-contact lip is contacted to the inner and/or outer surfaces of the door glass.

According to another aspect of the present invention, the shape-variable member is made from shape memory alloy.

According to another aspect of the present invention, the door glass run further comprises a control section for controlling an operation of the at least one shape-variable member.

According to another aspect of the present invention, the control section includes a controller for controlling a power supply to the shape-variable member depending upon whether the door glass switch is turned on or off.

According to another aspect of the present invention, power is supplied to the shape-variable member while the door glass switch is turned on.

According to another aspect of the present invention, the at least one close-contact lip is rotated into the first position as the temperature of the shape-variable member is raised.

According to another aspect of the present invention, the shape-variable member is disposed at a connection between the body and the close-contact lip, the shape-variable member having one end embedded into the body and the other end embedded into the close-contact lip.

According to another aspect of the present invention, the shape-variable member substantially has a cross section of "β", "V" or "U".

According to still another aspect of the present invention, the body includes an elastic lip portion contacted to an end surface of the door glass.

According to yet still another aspect of the present invention, there is provided a method for driving the door glass run for an automobile, comprising the steps of: determining whether the door glass switch is turned on; supplying power to at least one shape-variable member embedded into the door glass run while the door glass switch is turned on, for causing at least one close-contact lip integrally formed with the door glass run not to be contacted to a door glass; and shutting off a power supply to the at least one shape-variable member while the door glass switch is turned off, for causing the at least one close-contact lip to be contacted to the door glass.

By the features of the present invention, since power is supplied to shape-variable members while a door glass switch is turned on, close-contact lips are prevented from contacting surfaces of the door glass, whereby the close-contact lips are not squeezed by the door glass during upward movement of the door glass which increases their durability. Further, by the fact that a power supply to the shape-variable members is shut off while the door glass switch is turned off, the close-contact lips are contacted to the surfaces of the door glass to prevent noise and foreign materials from flowing into the cabin, whereby a calm and comfortable on-board feeling is provided.

DESCRIPTION OF THE DRAWINGS

The above objects, and other features and advantages of the present invention will become more apparent after reading the following detailed description taken in conjunction with the drawings, in which:

FIG. 8 is a flow chart explaining a door glass run driving method according to the present invention.

DETAILED DESCRIPTION OF THE INVENTION

Figure 1:
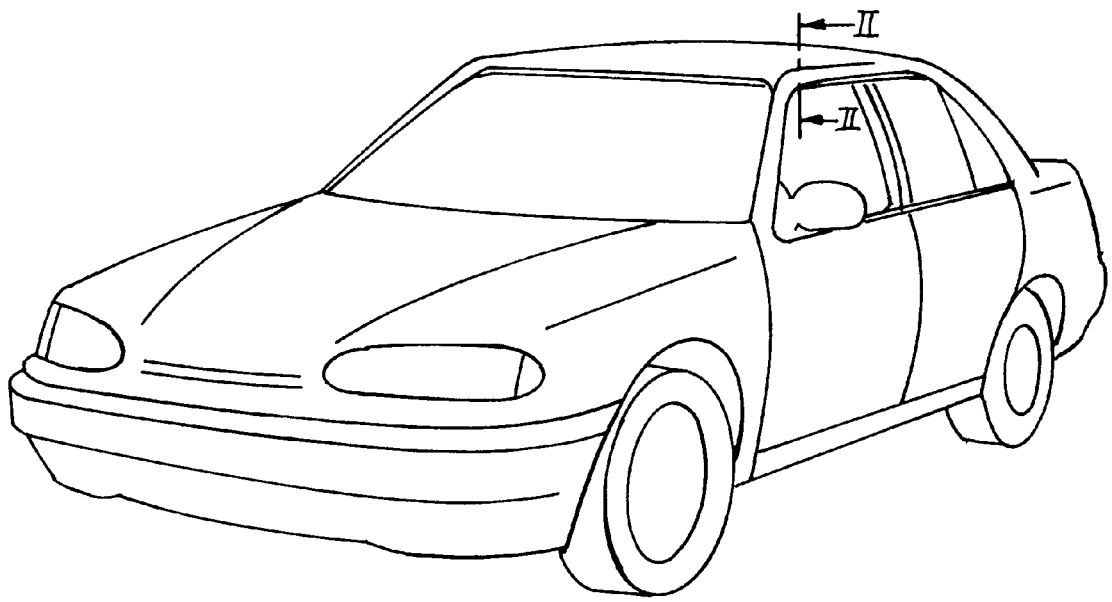
FIG. 1 is a perspective view illustrating the appearance of an automobile.
Figure 2:
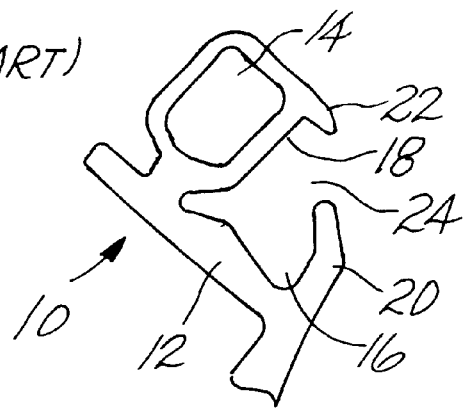
FIG. 2 is a cross-sectional view taken along the line II—II of FIG. 1, illustrating the construction of the door glass run according to the related art.
Figure 3:
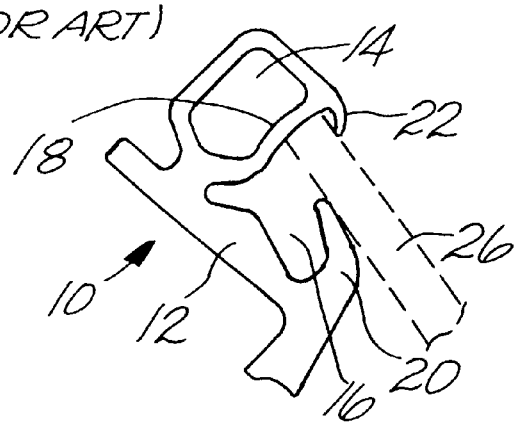
FIG. 3 is a cross-sectional view illustrating the door glass run and the door glass which are properly engaged with each other.
Figure 4:
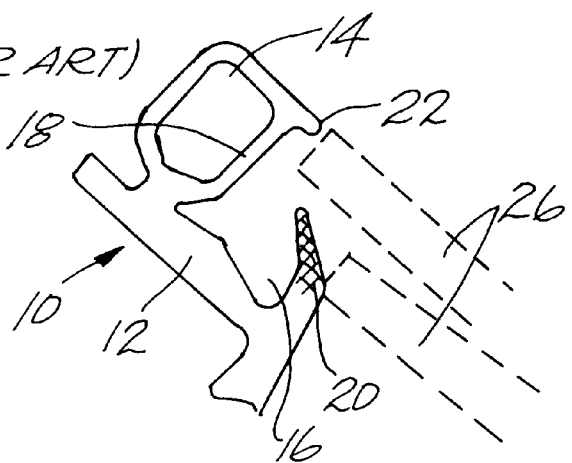
FIG. 4 is a cross-sectional view illustrating the door glass run and the door glass which are improperly engaged with each other.

Reference will now be made in greater detail to a preferred embodiment of the invention, an example of which is illustrated in the accompanying drawings. Wherever possible, the same reference numerals will be used throughout the drawings to refer to the same or like parts.

Figure 5:
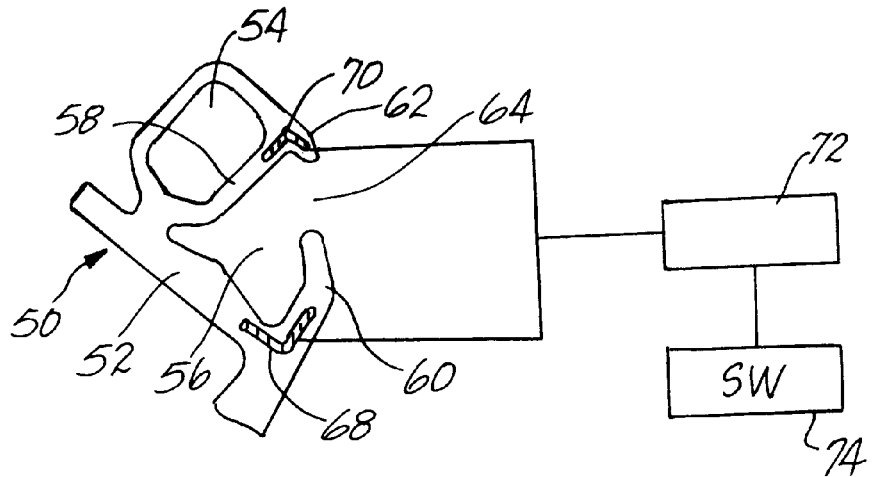
FIG. 5 is a cross-sectional view illustrating construction of a door glass run in accordance with an embodiment of the present invention.
Figure 6:
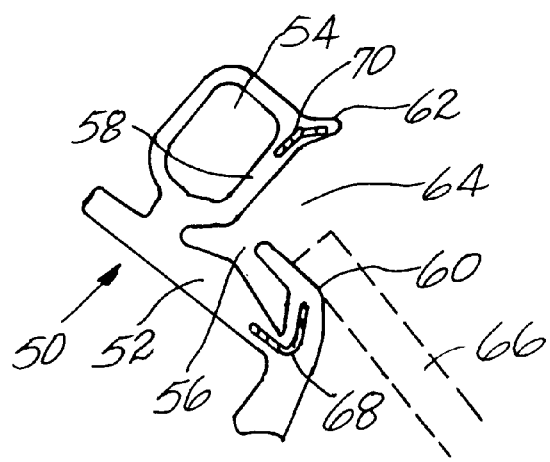
FIG. 6 is a cross-sectional view illustrating shape-variable members embedded into the door glass run, which are in an operating mode.
Figure 7:
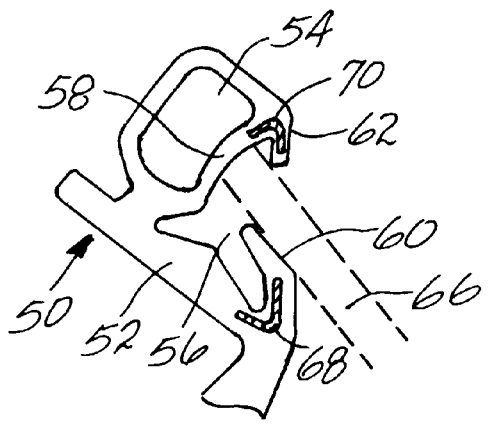
FIG. 7 is a cross-sectional view illustrating the shape-variable members which are in a nonoperating mode.

Referring to FIG. 5, there is shown a cross-sectional view illustrating construction of a door glass run in accordance with an embodiment of the present invention; FIG. 6 is a cross-sectional view illustrating shape-variable members embedded into the door glass run, which are in an operating mode; and FIG. 7 is a cross-sectional view illustrating the shape-variable members which are in a non-operating mode.

A door glass run 50 in accordance with an embodiment of the present invention includes a body 52, a pair of shape-variable members 68 and 70, and a controller 72. As clearly explained in the description of the related art, the body 52 is formed with a closed space 54 and a door glass receiving space 56. An elastic lip portion 58 is arranged between the closed space 54 and the door glass receiving space 56. The elastic lip portion 58 is capable of being elastically deformed and functions as a partition wall separating the closed space 54 and the door glass receiving space 56 from each other. The closed space 54 has a closed cross section. The door glass receiving space 56 is positioned adjacent to the closed space 54 and includes a portion that is opened to the outside. On edges of the body 52, which define the door glass receiving space 56, a first close-contact lip 60 and a second close-contact lip 62 are formed such that they are opposed to each other. An opening 64 is defined between the first close-contact lip 60 and the second close-contact lip 62. A door glass 66 can be received into the door glass receiving space 56 through the opening 64.

According to the present invention, a first shape-variable member 68 is embedded into a portion at which the body 52 and the first close-contact lip 60 are connected with each other, that is, at a point which defines a pivot axis of the first close-contact lip 60. A second shape-variable member 70 is embedded into a portion at which the elastic lip portion 58 and the second close-contact lip 62 are connected with each other, that is, at a point which defines a pivot axis of the second close-contact lip 62. One end of the first shape-variable member 68 is embedded into the a portion of the body 52, and the other end of the first shape-variable member 68 is embedded into a portion of the first close-contact lip 60. One end of the second shape-variable member 70 is embedded into a portion of the elastic lip portion 58, and the other end of the second shape-variable member 68 is embedded into a portion of the second close-contact lip 62. Each of the shape-variable members 68 and 70 substantially has a cross-section of 'β'. The close-contact lips 60 and 62 can be changed in their configuration when the shape-variable members 68 and 70 are changed in their configuration.

According to the preferred embodiment of the present invention, the shape-variable members 68 and 70 are made from shape memory alloy. Each of the shape-variable members 68 and 70 is connected to the controller 72 via a wire, and the controller 72 is connected to the door glass switch 74. The controller 72 detects whether the door glass switch 74 is turned on or off, and switches a power supply to the shape-variable members 68 and 70 depending upon detected results. When a power is supplied to the shape-variable members 68 and 70, the shape-variable members 68 and 70 are heated and thereby their configurations are changed. Accordingly, each of the shape-variable members 68 and 70 can be controlled between an operating mode in which they prevent the close-contact lips 60 and 62 from contacting the inner and outer surfaces of the door glass 66 and a non-operating mode in which they cause the close-contact lips 60 and 62 to contact the inner and outer surfaces of the door glass 66. According to the preferred embodiment of the present invention, the power is supplied to the shape-variable members 68 and 70 in the operating mode, and the power supply to the shape-variable members 68 and 70 is shut off in the non-operating mode.

When the shape-variable members 68 and 70 are in the operating mode in which power is supplied to them, each of the close-contact lips 60 and 62 rotates in a counter-clockwise direction, and thereby an area of the opening 64 widens. Accordingly, the close-contact lips 60 and 62 do not contact the inner and outer surfaces of the door glass 66 moving upward by the operation of the door glass switch 74. When the shape-variable members 68 and 70 are in the non-operating mode in which the power supply to them has been shut off, each of the close-contact lips 60 and 62 rotates in a clockwise direction and closely contacts the inner and outer surfaces of the door glass 66, respectively. At this time, the elastic lip portion 58 is also elastically deformed by an end surface of the door glass 66 continuously moving upwardly in the door glass receiving space 56. As shown in FIGS. 6 and 7, the shape-variable members 68 and 70 substantially have a cross section of 'V' in the operating mode and a cross section of 'U' in the non-operating mode.

Hereinafter, a method for driving the door glass run 50 constructed as mentioned above will be described in detail with reference to FIG. 8.

The program starts in step 100, and the controller 52 determines whether the door glass switch 74 is turned on in step 110. If the door glass switch 74 is turned on, the program proceeds to step 120, and if the door glass switch 74 is not turned on, the program returns to step 110. In step 120, the controller 72 supplies the power to the shape-variable members 68 and 70, and the shape-variable members 68 and 70 are converted into the operating mode to rotate the close-contact lips 60 and 62 in the counterclockwise direction thereby to prevent the close-contact lips 60 and 62 from contacting the inner and outer surfaces of the door glass 66. Then, the program proceeds to step 130 in which the controller 72 determines whether the door glass switch 74 is turned off. If the door glass switch 74 is turned off, the program proceeds to step 140, and if the door glass switch 74 is not turned off, the program returns to step 130. In step 140, the controller 72 shuts off the power supply to the shape-variable members 68 and 70, and the shape-variable members 68 and 70 are converted from the operating mode into the non-operating mode to rotate the close-contact lips 60 and 62 in the clockwise direction thereby to cause the close-contact lips 60 and 62 to contact the inner and outer surfaces of the door glass 66. Then, the program ends at step 150.

By the construction of the door glass run according to the present invention, since power is supplied to shape-variable members while the door glass switch is turned on, close-contact lips are prevented from contacting the surfaces of the door glass, whereby the close-contact lips are not squeezed by the door glass during upward movement of the door glass which increases its durability. Further, by the fact that a power supply to the shape-variable members is shut off while the door glass switch is turned off, the close-contact lips contact the surfaces of the door glass to prevent noise and foreign material from flowing into the cabin, whereby a calm comfortable on-board feeling is provided.

In the drawings and specification, there have been disclosed typically preferred embodiments of the invention and, although specific terms are employed, they are used in a generic and descriptive sense only and not for purposes of limitation, the scope of the invention being set forth in the following claims.

What is claimed is:

1. A door glass run for an automobile, comprising:
   a body having at least one lip and a recess to receive a door class;
   at least one shape-memory alloy embedded into said body which causes said at least one lip to rotate between a first position in which said at least one lip is positioned away from the door glass when the door class is located in the recess and a second position in which said at least one lip is positioned against the door glass when the door glass is located in the recess; and
   a controller coupled with the shape-memory alloy to supply power to the shape-memory alloy to cause the lip to rotate between the first and second positions while a door glass switch is turned on.

2. A door glass run for an automobile as claimed in claim 1, wherein said at least one lip is rotated into said first position as the temperature of said shape-memory alloy is raised.

3. A door glass run for an automobile as claimed in claim 1, wherein said shape-memory alloy is disposed at a connection between said body and said lip, said shape-memory alloy having one end embedded into said body and the other end embedded into said lip.

4. A door glass run for an automobile as claimed in claim 1, wherein said shade-memory alloy substantially has a cross-section of "V".

5. A door glass run for an automobile as claimed in claim 1, wherein the lip includes an elastic portion contacted to an end surface of said door glass, when the door glass is located in the recess.

6. The door glass run of claim 1 wherein the at least one lip includes first and second lips in the body;
   wherein the at least one shape-memory alloy includes first and second shape-memory alloys;
   wherein the body has a first connection between said body and said first lip, and a second connection between said body and said second lip, wherein the first and second connections define a pivot axis of the first and second lips, respectively;
   wherein said first shape-memory alloy is embedded in the body and in the first lip and is disposed at the first connection, and said second shape-memory alloy is embedded in the body and in the second lip and is disposed at the second connection; and
   wherein the first and second lips each rotate between the first position in which the first and second lips are each positioned away from the door glass when the door glass is located in the recess and a second position in which the first and second lips are each positioned against the door glass when the door glass is located in the recess.

7. A method for driving a door glass run for an automobile comprising:
   determining whether a door glass switch that moves a door glass is turned on;
   supplying a power to at least one shape-memory alloy embedded into said door glass run while said door glass switch is turned on, wherein the power supply causes at least one lip integrally formed with said door glass run not to be contacted to the door glass; and
   shutting off the power supply to said at least one shape-memory alloy while said door glass switch is turned off, wherein shutting off the power supply causes said at least one lip to be contacted to said door glass.

8. A door glass assembly for an automobile comprising:
   a door glass run having a body with a lip and an opening in the body that receives a door glass, wherein the door glass has an up position and a down position, and a shape-memory alloy embedded into the body, wherein the shape-memory alloy causes the lip to rotate between a first position in which the lip is positioned towards the opening that receives the door glass and a second position in which the lip is positioned away from the opening;

a door glass switch moving the door glass between the up and down positions, and having an on position; and a controller coupled with the door glass switch and actuating the shape-memory alloy to move the lip between the first and second positions when the door glass switch is in the on position.

9. A door glass assembly for an automobile comprising:

a door glass having an up position and a down position;

a door glass run having a body with a lip and an opening that receives the door glass, and a shape-memory alloy embedded into the body, wherein the shape-memory alloy causes the lip to rotate between a first position in which the lip does not contact the door glass when the door glass is in the up position and a second position in which the lip contacts the door glass when the door glass is in the up position;

a door glass switch having an on position, wherein the door glass switch moves the door glass between the up position and the down position; and a controller connected to the door glass switch, wherein the door glass switch actuates the controller to operate the shape-memory alloy by supplying power to the shape-memory alloy while the door glass switch is in the on position.

* * * * *